US007590971B2

(12) United States Patent
Ferguson et al.

(10) Patent No.: US 7,590,971 B2
(45) Date of Patent: Sep. 15, 2009

(54) ENTERPRISE TASK MANAGER

(75) Inventors: John R. Ferguson, Concord, MA (US); Shannon Bradley, Brighton, MA (US); Stephen A. Canzano, Shrewsbury, MA (US); Sean T. McKenna, West Roxbury, MA (US); James R. Tice, Jamaica Plain, MA (US)

(73) Assignee: IDX Investment Corporation, South Burlington, VT (US)

( * ) Notice: Subject to any disclaimer, the term of this patent is extended or adjusted under 35 U.S.C. 154(b) by 1405 days.

(21) Appl. No.: 10/632,328

(22) Filed: Aug. 1, 2003

(65) Prior Publication Data

US 2005/0028158 A1 Feb. 3, 2005

(51) Int. Cl.
*G06F 9/45* (2006.01)
(52) U.S. Cl. ...................................... 717/109
(58) Field of Classification Search ......... 718/100–102; 717/109
See application file for complete search history.

(56) References Cited

U.S. PATENT DOCUMENTS

| 5,072,383 | A | 12/1991 | Brimm et al. | 364/413.02 |
|---|---|---|---|---|
| 5,077,666 | A | 12/1991 | Brimm et al. | 364/413.02 |
| 5,625,821 | A * | 4/1997 | Record et al. | 718/100 |
| 5,832,450 | A | 11/1998 | Myers et al. | 705/3 |
| 6,272,481 | B1 | 8/2001 | Lawrence et al. | 706/45 |
| 6,324,516 | B1 | 11/2001 | Shults et al. | 705/2 |
| 6,377,971 | B1 | 4/2002 | Madden et al. | 709/108 |
| 6,389,454 | B1 | 5/2002 | Ralston et al. | 709/204 |
| 6,405,211 | B1 | 6/2002 | Sokol et al. | 707/103 |
| 6,430,618 | B1 | 8/2002 | Karger et al. | 709/225 |
| 6,457,049 | B2 * | 9/2002 | Lewis et al. | 718/100 |
| 6,551,243 | B2 | 4/2003 | Bocionek et al. | 600/300 |

(Continued)

FOREIGN PATENT DOCUMENTS

WO   WO01/24098   4/2001

(Continued)

OTHER PUBLICATIONS

Chi, Robert Taui Lai et. al. Ada Taxonomy Support for Concurrent Programming ACM Software Engineering Support Notes vol. 16, No. 1, pp. 73-91.*

(Continued)

*Primary Examiner*—John Chavis
(74) *Attorney, Agent, or Firm*—Andrus, Sceales, Starke & Sawall, LLP

(57) ABSTRACT

An enterprise task management system (24) for managing data maintenance tasks across multiple applications. System (24) includes a task manager module (60) and a task engine module (62). Task manager module (60) includes two primary graphical user interfaces: a user interface (64) and a system administrator interface (66). User interface (64) includes an enterprise task list (22), a preview text box (96), and an instructions text box (100). Task engine module (62) includes the following sub-modules: ETM system setup (70) and task generation (72). Another aspect of the present invention is a system architecture for centrally managing the creation of tasks. Additional aspects of the present invention include a method of generating data maintenance tasks within an enterprise information system, a method of populating task data fields using task templates, and a method of automatically generating and performing tasks within system (24).

12 Claims, 14 Drawing Sheets

U.S. PATENT DOCUMENTS

| | | | |
|---|---|---|---|
| 6,662,205 B1* | 12/2003 | Bereiter | 709/201 |
| 6,714,913 B2 | 3/2004 | Brandt et al. | 705/2 |
| 6,801,227 B2 | 10/2004 | Bocionek et al. | 715/777 |
| 6,912,549 B2 | 6/2005 | Rotter et al. | 707/200 |
| 7,127,446 B1* | 10/2006 | Menezes et al. | 718/102 |
| 2002/0005894 A1* | 1/2002 | Foodman et al. | 348/143 |
| 2002/0032688 A1* | 3/2002 | Serrano-Morales et al. | 707/104.1 |
| 2002/0093537 A1* | 7/2002 | Bocioned et al. | 345/777 |
| 2002/0133641 A1 | 9/2002 | Royer et al. | 709/329 |
| 2002/0135612 A1 | 9/2002 | Royer et al. | 345/741 |
| 2002/0158911 A1 | 10/2002 | O'Rourke | 345/810 |
| 2002/0158912 A1 | 10/2002 | O'Rourke | 345/810 |
| 2002/0161795 A1 | 10/2002 | O'Rourke | 707/500 |
| 2002/0188644 A1* | 12/2002 | Seidman | 709/100 |
| 2003/0045958 A1* | 3/2003 | Brandt et al. | 700/10 |
| 2003/0046280 A1 | 3/2003 | Rotter et al. | 707/6 |
| 2003/0050797 A1 | 3/2003 | Brandt et al. | 705/2 |
| 2003/0050800 A1 | 3/2003 | Brandt et al. | 705/2 |
| 2003/0050821 A1 | 3/2003 | Brandt et al. | 705/9 |
| 2003/0061090 A1 | 3/2003 | Marano | 705/9 |
| 2003/0074220 A1 | 4/2003 | Brandt | 705/2 |
| 2003/0135384 A1* | 7/2003 | Nguyen | 705/1 |
| 2004/0039623 A1 | 2/2004 | Setteducati | 705/8 |
| 2004/0111302 A1 | 6/2004 | Falk et al. | 705/4 |
| 2004/0172284 A1 | 9/2004 | Sullivan et al. | 705/2 |

FOREIGN PATENT DOCUMENTS

| | | |
|---|---|---|
| WO | WO02/01483 | 1/2002 |
| WO | WO02/25565 | 3/2002 |
| WO | WO02/25566 | 3/2002 |
| WO | WO02/39250 | 5/2002 |
| WO | WO02/41134 | 5/2002 |
| WO | WO02/41135 | 5/2002 |
| WO | WO02/41137 | 5/2002 |
| WO | WO02/41230 | 5/2002 |
| WO | WO02/42945 | 5/2002 |

OTHER PUBLICATIONS

Bigus et al. Able: A toolkit for Building Multiagent Autonomic Systems IBM Systems Journal vol. 41, No. 3, pp. 350-371; Apr. 2002.*

PCT Search Report mailed Jul. 7, 2008.

Bigus et al., "Able: A toolkit for building multiagent autonomic systems", IBM Systems Journal vol. 41, No. 3, pp. 305-371, 2002.

Chi et al., "Ada Task Taxonomy Support for Concurrent Programming", ACM Software Engineering Support Notes, vol. 16, No. 1, pp. 73-91, Jan. 1991.

* cited by examiner

TASK LIST 107

| Task Name | Edit Message | Patient Name | Inv # | Inv Bal | Filing Date |
|---|---|---|---|---|---|
| Fatal Front End edit | F - Missing Ref Phy/Con Chg | CONTRACT, TEST | 8002041 | 283.00 | 09/02/2002 |
| Fatal Front End edit | F - Missing Dx 1 Code | CONTRACT, TEST | 8002041 | 283.00 | 09/02/2002 |
| Fatal Front End edit | F - Missing Hosp Ip/Op/Lab | CONTRACT, TEST | 8002041 | 283.00 | 09/02/2002 |
| Fatal Front End edit | F - Missing Dx 1 Code | CONTRACT, TEST | 8002162 | 1000.00 | 09/03/2002 |
| FatalRegistration Edit | R - Pt Age Require Empl St... | DAVIS, LAWANDA S | 8001372 | 40.00 | 06/15/2002 |
| FatalRegistration Edit | R - Pt Age Require Empl St... | DAVIS, LAWANDA S | 8001373 | 40.00 | 06/15/2002 |
| FatalRegistration Edit | R - Pt Age Require Empl St... | RAMSEY, PAYTON M. | 8001537 | 40.00 | 06/15/2002 |
| FatalRegistration Edit | R - Pt Age Require Empl St... | RAMSEY, PAYTON M. | 8001538 | 40.00 | 06/15/2002 |
| FatalRegistration Edit | R - Pt Age Require Empl St... | SEXTON, TAMMY L. | 8000943 | 29.00 | 06/12/2002 |
| FatalRegistration Edit | R - Pt Age Require Empl St... | SIMS, SATIN | 8001332 | 254.00 | 06/15/2002 |
| FatalRegistration Edit | R - Pt Age Require Empl St... | SUTHERLIN, MONICA | 8000475 | 254.00 | 06/12/2002 |
| Fatal Front End edit | F - Missing Dx 1 Code | TEST, HEZEKIAH | 8001999 | 75.00 | 09/02/2002 |
| Fatal Front End edit | F - Missing Hosp Ip/Op/Lab | TEST, HEZEKIAH | 8001999 | 75.00 | 09/02/2002 |
| FatalRegistration Edit | R - Missing Cert # | CONTRACT, TEST | 8002169 | 200.00 | 09/07/2002 |
| FatalRegistration Edit | R - Missing Cert # | FAGALA, CHARLES | 8002096 | 0.00 | 08/27/2002 |

Preview:
Fatal Front End edit
F - Missing Ref Phy/Con Chg

CONTRACT, TEST
SSN: 123-45-6789
MRN: 08004744
Sex: M DOB: 02/25/1978
111 Mockingbird Ln
Allston, MA 02134
Pat Phone:
Alt Phone:
FSC: BLUE SHIELD ALLIANCE CHOICE
InsCo: BLUE SHIELD MISSOURI
Cert: 12312312
EffDt:
Inv #: 8002041
DOS: 03/05/2003
Prov: WRIGHT MD, JAMES
B/A: IM/MEDICAL EDUCATION
Loc: WOHL CLINIC OUTPATIENT
Ref Phy:
Bal: 283.00
FSC: BLUE CHIELD ALLIANCE CHOICE

FIG. 5

ENTERPRISE TASK MANAGER

FIELD OF THE INVENTION

The present invention relates generally to a task management system and more particularly relates to a task management system for centrally managing tasks across an entire enterprise.

BACKGROUND

The rising cost of providing healthcare services has increased the consolidation of healthcare service providers and thus the size of integrated delivery networks (IDN). Management of large IDNs poses unique organizational problems. The result is often increased revenue cycles with respect to patient billing and poorer customer service. Existing task management structures are often not flexible enough to effectively handle the dynamic changes that occur on an on-going basis in large IDNs.

In order to manage the volume of data in IDNs, healthcare provider organizations have turned to sophisticated data management systems or applications. Typically, these systems include modules for maintaining or improving the quality of data. By improving the quality of data, i.e., correcting errors and or omissions in data, the revenue cycle for patient billing may be reduced and the overall service to customers may be improved. Generally, for each healthcare service provider in the IDN, a task list is developed and populated with tasks for improving data specific to that particular provider. A user such as a data clerk is often responsible for working the tasks that populate the task lists.

For large IDNs, the tasks that populate the task lists may include tasks input by users of the system, tasks input by third party systems, and tasks generated by the data management system itself. Prior art data management systems typically are not capable of integrating tasks from across an entire enterprise or IDN. Rather, prior art systems typically include a plurality of task lists and require users to "jump" from one task list to another to work tasks. In addition, prior art systems including multiple task lists do not allow a system administrator to easily manage all of the tasks in the system from a single interface. As a result, tasks are sometimes duplicated, lost, incorrectly entered, and incorrectly worked. Generally, system resources are often not efficiently used.

SUMMARY OF THE INVENTION

One aspect of the present invention is an enterprise information system for managing data maintenance tasks across multiple applications within an enterprise. The system includes a task manager module having an enterprise task list, the enterprise task list including tasks generated outside the system at the multiple applications and tasks generated within the system, and a task engine module adapted to create tasks, the task engine module in communication with the task manager module.

Another aspect of the present invention is a method of generating data maintenance tasks within an enterprise information system, the method including the following steps: filing a source object and event to the system; determining whether the event is a custom event or a system event; adding all system events to an event queue; determining for each of the custom events whether a corresponding custom event ruleset is true; adding each of the custom events where the corresponding custom event ruleset is true to the event queue; determining for each of the custom or system events in the event queue whether a task definition corresponding to each of the custom or system events exists; determining for each task definition corresponding to each of the custom or system events whether a task definition ruleset is true; and generating a task for each of the custom or system events having a task definition ruleset that is true.

Still another aspect of the present invention is a graphical user interface for use in an enterprise information system for managing data maintenance tasks across multiple applications. The graphical user interface includes a first portion having an enterprise task list. The enterprise task list includes tasks generated outside the system at the multiple applications and tasks generated within the system.

Another aspect of the present invention is a system architecture for centrally managing the creation of tasks. The system architecture includes the following: a source object layer including one or more source objects, each of the one or more source objects having a corresponding event; a target object layer including one or more target objects; and an enterprise task manager layer between said source object layer and said target object layer, wherein said enterprise task manager layer centrally manages relationships between each of the one or more source objects and each of the one or more target objects.

Still another aspect of the present invention is a method of populating task data fields using task templates. The method includes the following steps: populating each of the task data fields that are empty with data from corresponding data fields in a task definition template; populating each of the task data fields that are empty with data from corresponding data fields in a task name template; populating each of the task data fields that are empty with data from corresponding data fields in a source object template; and populating each of the task data fields that are empty with data from corresponding data fields in a system template.

Yet another aspect of the present invention is a method of automatically generating and performing tasks within an enterprise task management system. The method includes the following steps: providing an agent including a predetermined ruleset; comparing data against the predetermined rules of the agent; and causing the system to generate tasks according to the predetermined ruleset of the agent.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 5 is a schematic diagram of a graphical user interface according to one embodiment of the present invention;

DETAILED DESCRIPTION OF THE INVENTION

The present invention is directed to an enterprise task management system for managing data maintenance tasks across multiple applications. The present invention includes a system having an enterprise task list, a graphical user interface, an architecture, and processes for creating and managing tasks across an enterprise such as an IDN. Examples of the disclosed invention are depicted in FIGS. 1-16, although it should be understood that the present invention is not limited to this (or any other) particular embodiment, but rather is intended to cover all systems, graphical user interfaces, architectures, and processes that fairly fall within the broad scope of the appended claims.

Figure 1:
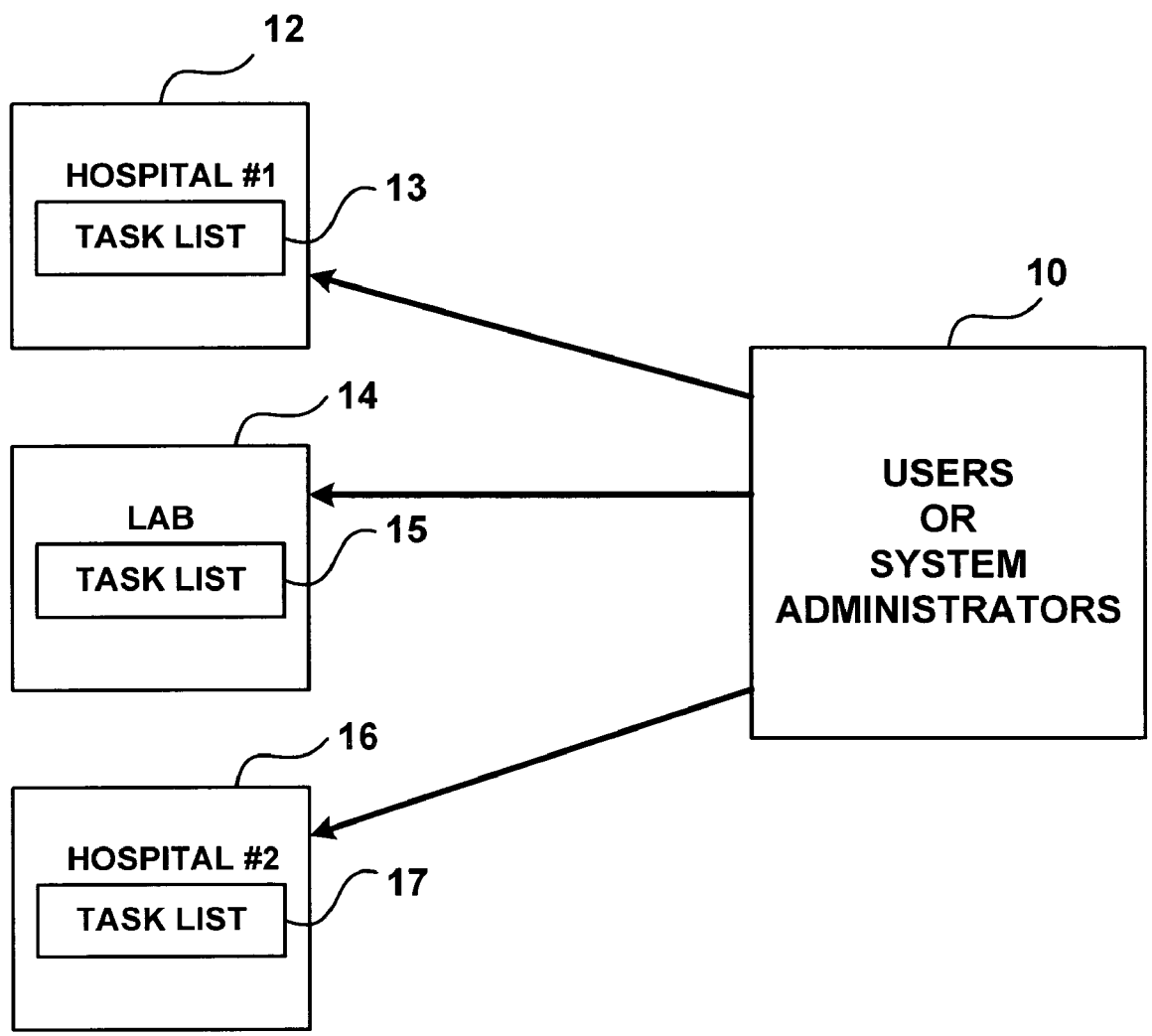
FIG. 1 is a simplified schematic diagram of a prior art configuration for accessing tasks created by a plurality of providers in an IDN.

Turning to the drawings, wherein like reference numerals refer to like elements, FIG. 1 illustrates how a user or system administrator accesses data maintenance task lists in a prior art data management system. Typically, a user or system administrator 10 has to access a separate data management system for each healthcare service provider in the IDN. i.e., "HOSPITAL #1" 12, "LAB" 14, and "HOSPITAL #2" 16, to view its respective task list, i.e., task lists 13, 15, and 17.

Figure 2:
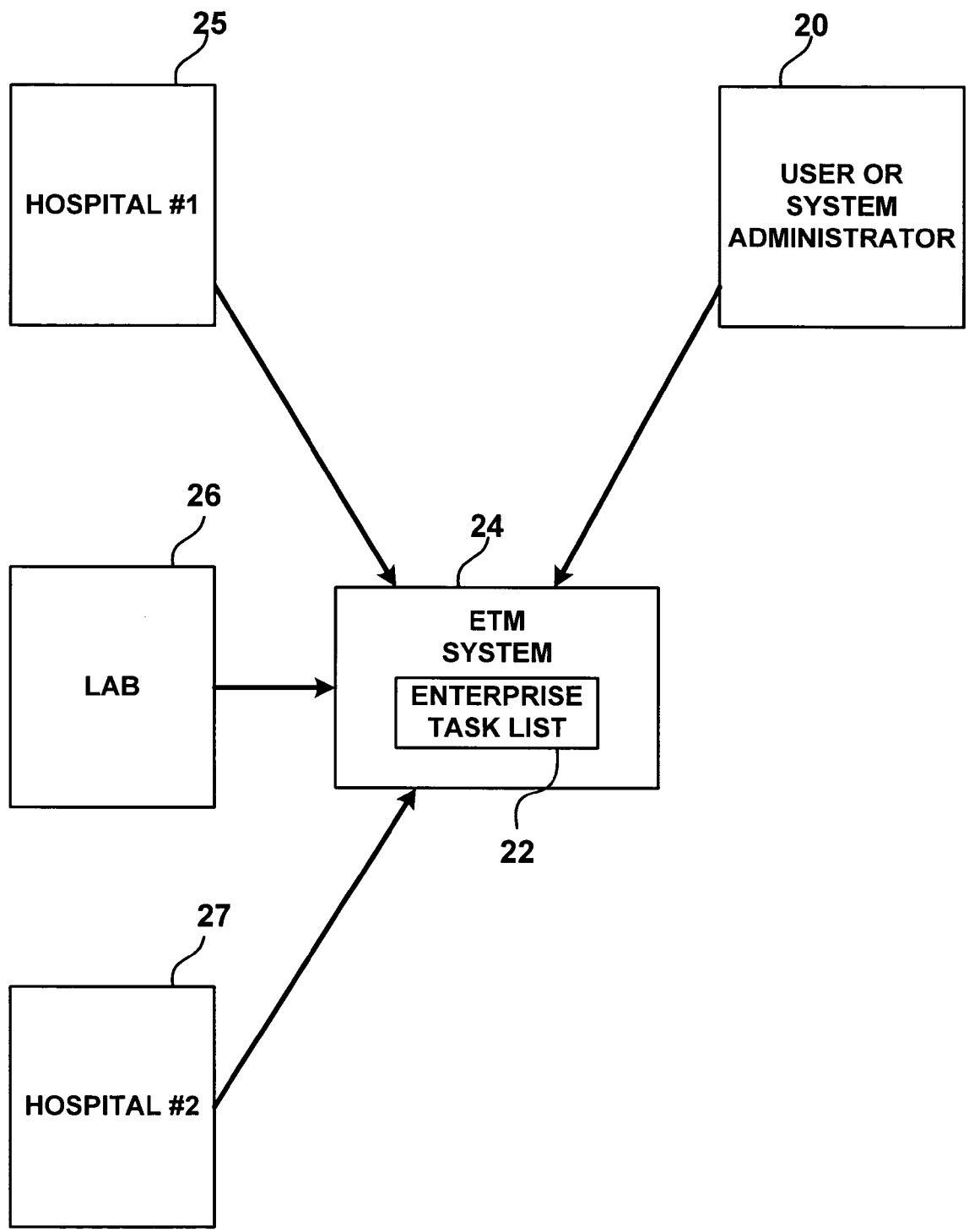
FIG. 2 is a simplified schematic diagram of a configuration for accessing tasks created by a plurality of providers in an IDN according to one embodiment of the present invention.

FIG. 2 illustrates how a user or system administrator accesses data maintenance task lists in the enterprise task management (ETM) system of the present invention. In the ETM system of the present invention, a user or system administrator 20 only has to access a single task list, i.e., an enterprise task list 22, in an ETM system 24, which are both described in greater detail below, to view all tasks in the IDN. Data maintenance tasks related to each of the healthcare service provider in the IDN, i.e., "HOSPITAL #1" 25, "LAB" 26, and "HOSPITAL #2" 27, are maintained on enterprise task list 22.

Figure 3:
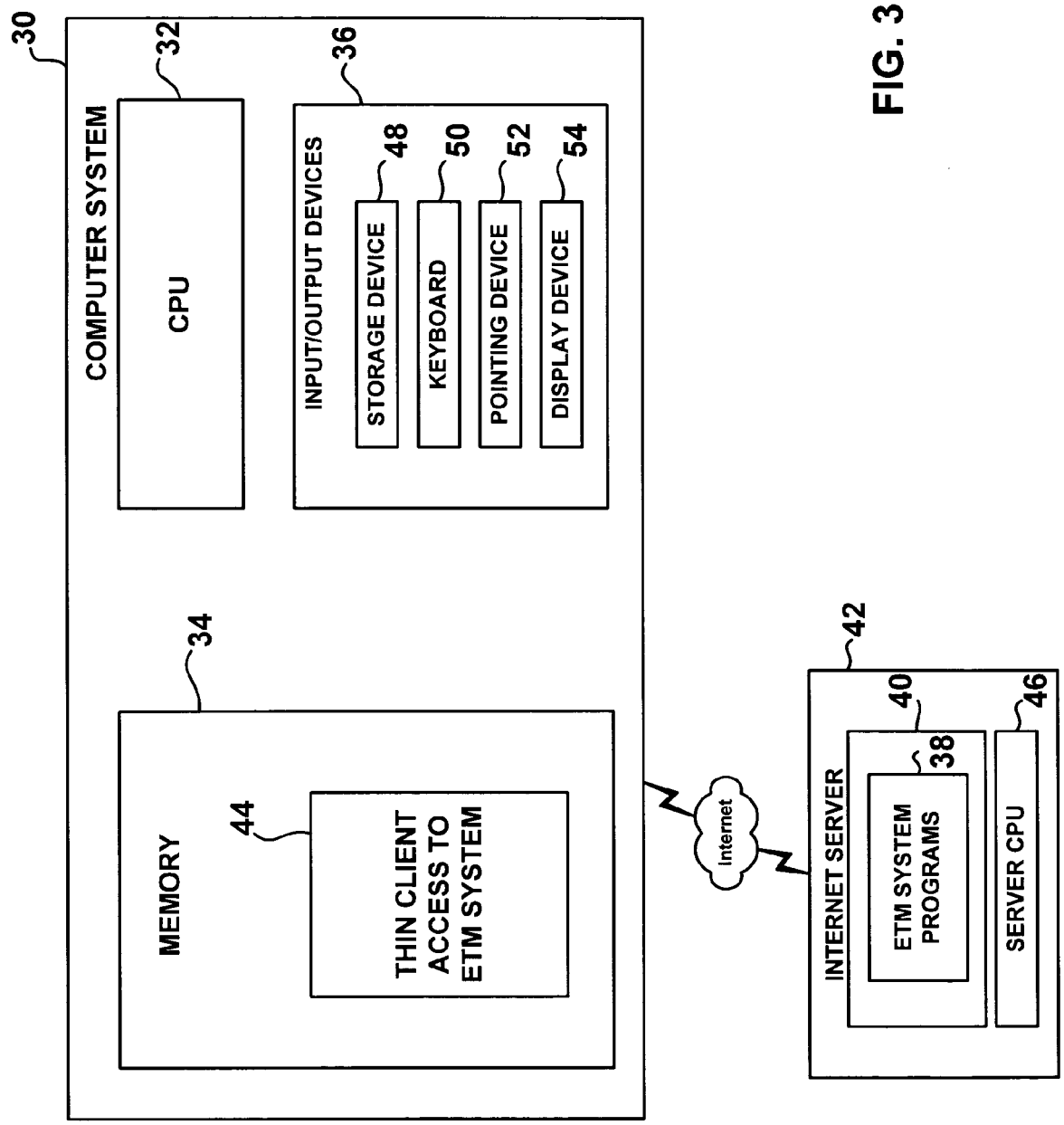
FIG. 3 is a simplified schematic diagram of a computer system for accessing the ETM system according to one embodiment of the present invention.

Referring to FIG. 3, ETM system 24 of the present invention is illustrated as being implemented in an appropriate computing environment. Although not required, the invention will be described generally in terms of computer-executable instructions, such as program modules, being executed by a conventional, general purpose, digital computer. Typically, program modules include routines, programs, objects, components, data structures, etc. that perform specific tasks. The invention may be practiced with a variety of computer system configurations, including networked client-server computing systems, hand-held devices, programmable consumer electronics, minicomputers, mainframe computers, and the like. The invention will typically, but not necessarily, be practiced in distributed computing environments where tasks are performed by remote processing devices that are linked through a communications network, e.g., a LAN, WAN or an Internet-based network. In a distributed computing environment, program modules may be located in both local and remote memory storage devices.

It is contemplated that the system of the present invention will operate in a networked computing environment including a personal computer 30 and an Internet server 42. Personal computer 30 includes a computer central processing unit (CPU) 32, a computer memory 34, and input/output devices 36. Typically, ETM system computer programs 38 reside in a server memory 40 of an Internet server 42. Of course, ETM system computer programs 38 may reside in the memory of a local or wide area network server or in the memory of an individual desktop computer system. Typically, ETM system computer programs 38 may be accessed via a thin client access program 44 that resides in computer memory 34 of computer system 30. In such a configuration, ETM system computer programs 38 may be executed on either or both an Internet server CPU 46 and computer CPU 32. Input/output devices 36 typically include a storage device 48, such as a hard disk drive, a keyboard 50, a pointing device 52, i.e., a mouse, and a display device 54, such as a monitor.

Figure 4:
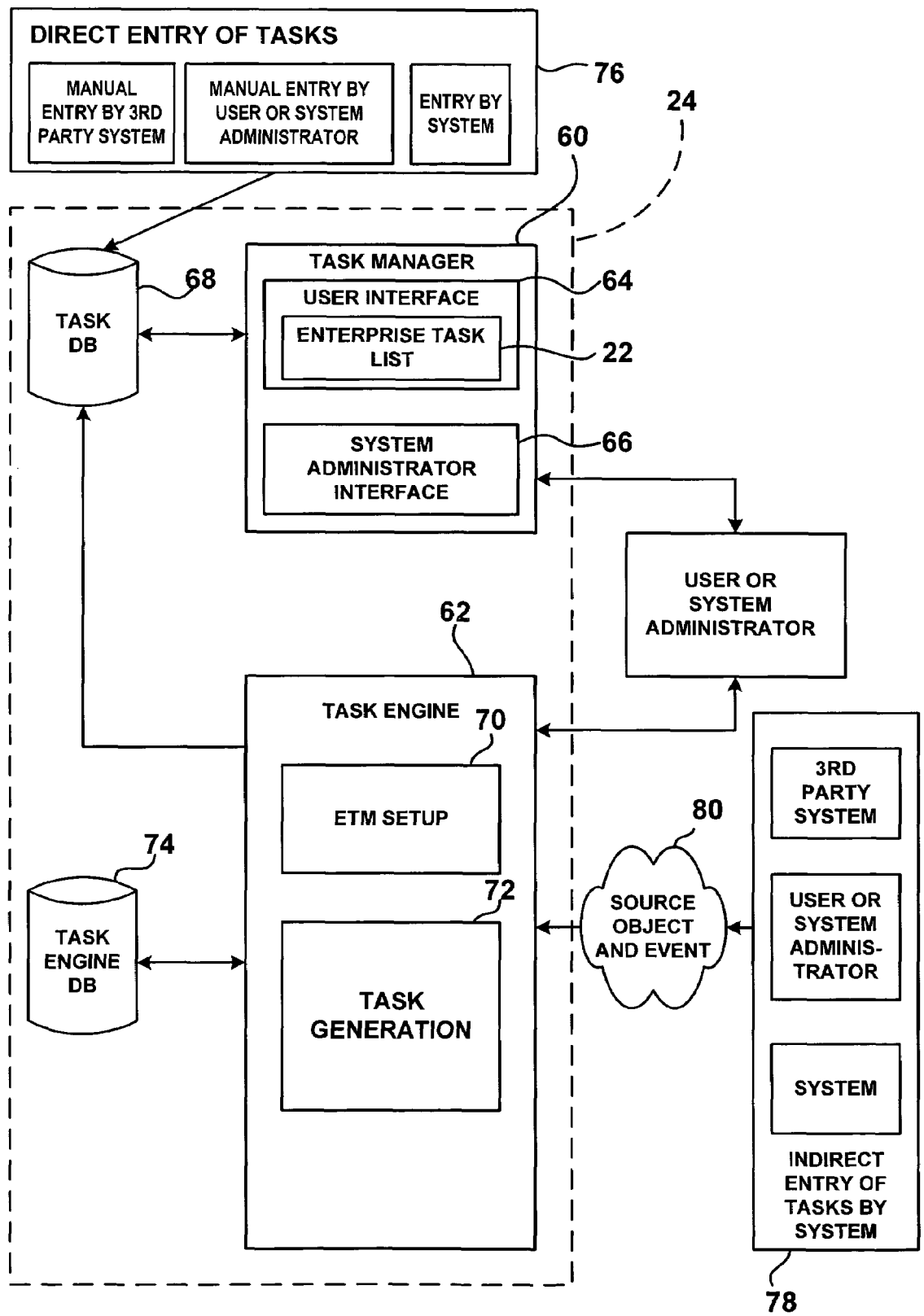
FIG. 4 is a schematic diagram of the enterprise task manager system according to one embodiment of the present invention.

Referring now to FIG. 4, one embodiment of the enterprise task manager system (may be referred to herein as "ETM system", "system", or "ETM") is illustrated. Dashed lines in FIG. 4 enclose ETM system 24 and its various components. ETM system 24 includes two primary modules, a task manager module 60 and a task engine module 62. Task manager module 60 includes two primary interfaces, a user interface 64 and a system administrator interface 66. Both user interface 64 and system administrator interface 66 are typically graphical user interfaces (GUI) that are displayed to a user or system administrator via a display device 54. Accordingly, user interface 64 and system administrator interface 66 may be referred to herein as GUI 64 and GUI 66, respectively. User interface 64 includes enterprise task list 22, which was described above with respect to FIG. 2. Task manager module 60 is supported by and in communication with a task database 68. Task engine module 62 primarily includes two sub-modules: ETM system setup 70 and task generation 74. Task engine module 62 is supported by and in communication with a task engine database 78.

As described above, enterprise task list 22 serves as a central repository for tasks (not shown) generated across an IDN or similar enterprise. The tasks included on enterprise task list 22 are stored in task database 68. Enterprise task list 22, which is part of user interface 64 within task manager module 60, may be populated with tasks 76 that are directly entered into task database 68 or tasks 78 that are indirectly entered into task database 68 via task generation sub-module 74 of ETM system 24.

Tasks 76 that are directly entered into task database 68 are typically entered by a user, system administrator, and or $3^{rd}$ party data maintenance system. Tasks 76 may also be directly entered into task database 68 by ETM system 24 by an agent. As described in greater detail below, tasks 78 are developed by task generation sub-module 74 in response to interaction between ETM system 24 and any one or all of a user or system administrator, a $3^{rd}$ party system, or by ETM system 24 itself through the use of agents or the like. Interaction with ETM system 24 causes a source object and associated event 80 to be filed to task generation sub-module 72 of ETM system 24. Objects are components of a system that might require tasks. For example, in the context of a healthcare IDN, a patient, an invoice, and an appointment may all be objects. Typically, there are two types of objects: source and target. A source object is an object that files to the system and may trigger a task. For example, if a claim form edit object files to the system, it may trigger a task to update a patient's registration information. A target object is the object that needs attention for the task. For example, if a task instructs a user to update a patient's registration information, the target object is Patient. Events are the actions that occur when source objects file to the system. For example, when you edit a patient record and file, the source object is Patient and the event is Edit. Events are typically referred to as "statefull" in that they are surrounded by data from a source object. In contrast, a task is generally referred to as "stateless" because it begins as an empty shell that is populated with data based on the source object and event. Each time a source object files, either manually by a user or automatically by the system, task generation sub-module 72 evaluates the contents of the source object and associated event 80 and determines whether to generate and store a task in task database 68.

In use, a user primarily interacts with ETM system 24 via task manager module 60. Typically, a user accesses task manager module 60 via user interface 64 to view and work tasks that are included in enterprise task list 22. Task manager module 60 allows a user to create specific query-based views of enterprise task list 22, work tasks according to pre-determined work options, create/edit/view/remove tasks from enterprise task list 22, re-assign ownership of tasks to other users, change task status, etc. Depending on a user's skill and their level of access to the system, a user may access task engine module 62 to use ETM setup sub-module 70 for the creation of new tasks.

A system administrator typically interacts frequently with ETM system 24 via both task manager module 60 and task engine module 62. A system administrator accesses system manager module 60 via system administrator interface 66 and accesses task engine module 62 via ETM setup sub-module 70. A system administrator typically uses task manager module 60 to monitor productivity and task activity, create enterprise views to be used when viewing enterprise task list 22 as explained further below, and maintain overall system security. A system administrator typically accesses task engine module 62 to provide services to define tasks, define rules that govern the generation, execution, escalation, and completion of tasks, and create agents which operate within the system to automatically create or perform tasks.

Figure 6:
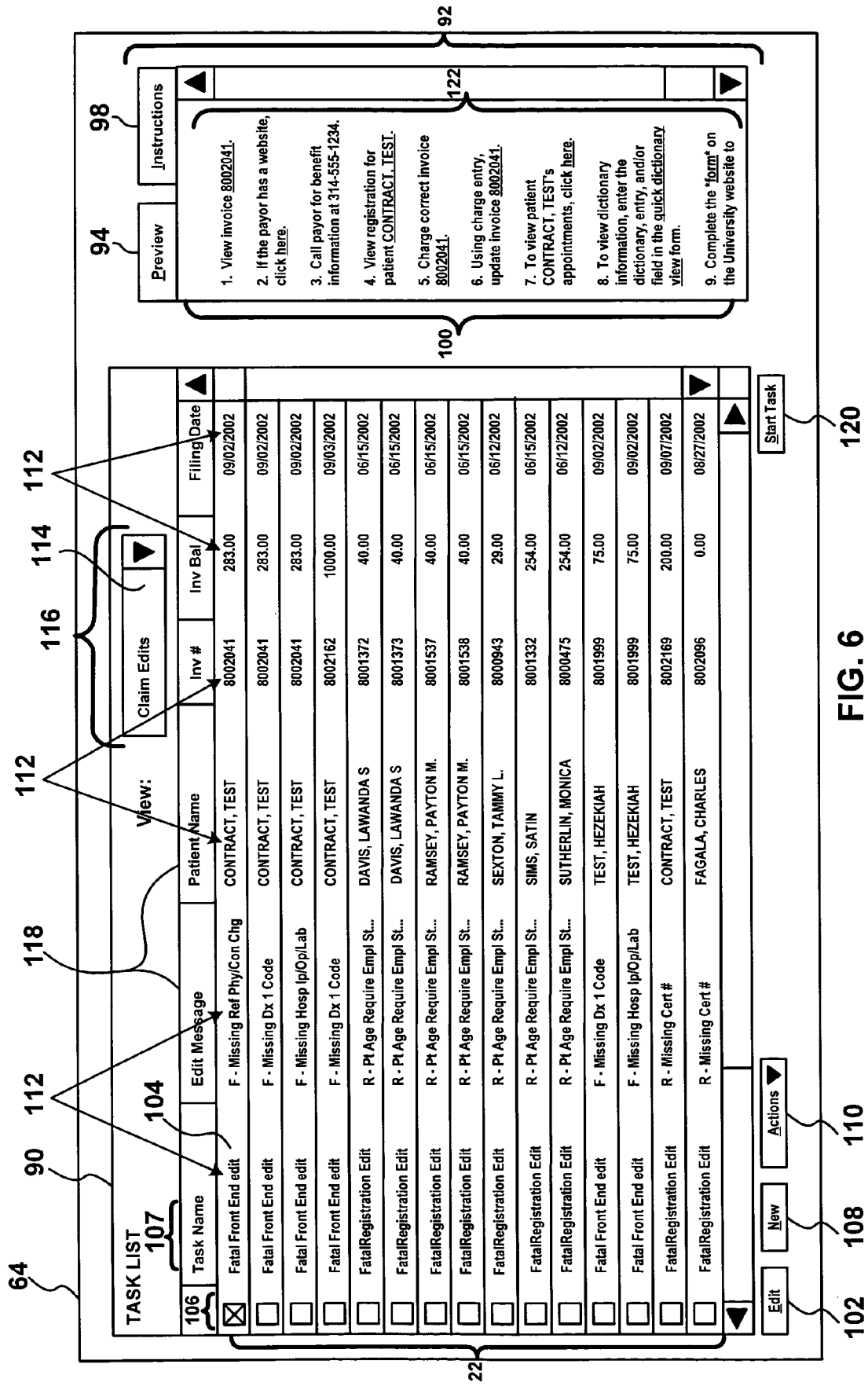
FIG. 6 is a schematic diagram of a graphical user interface according to one embodiment of the present invention.
Figure 7:
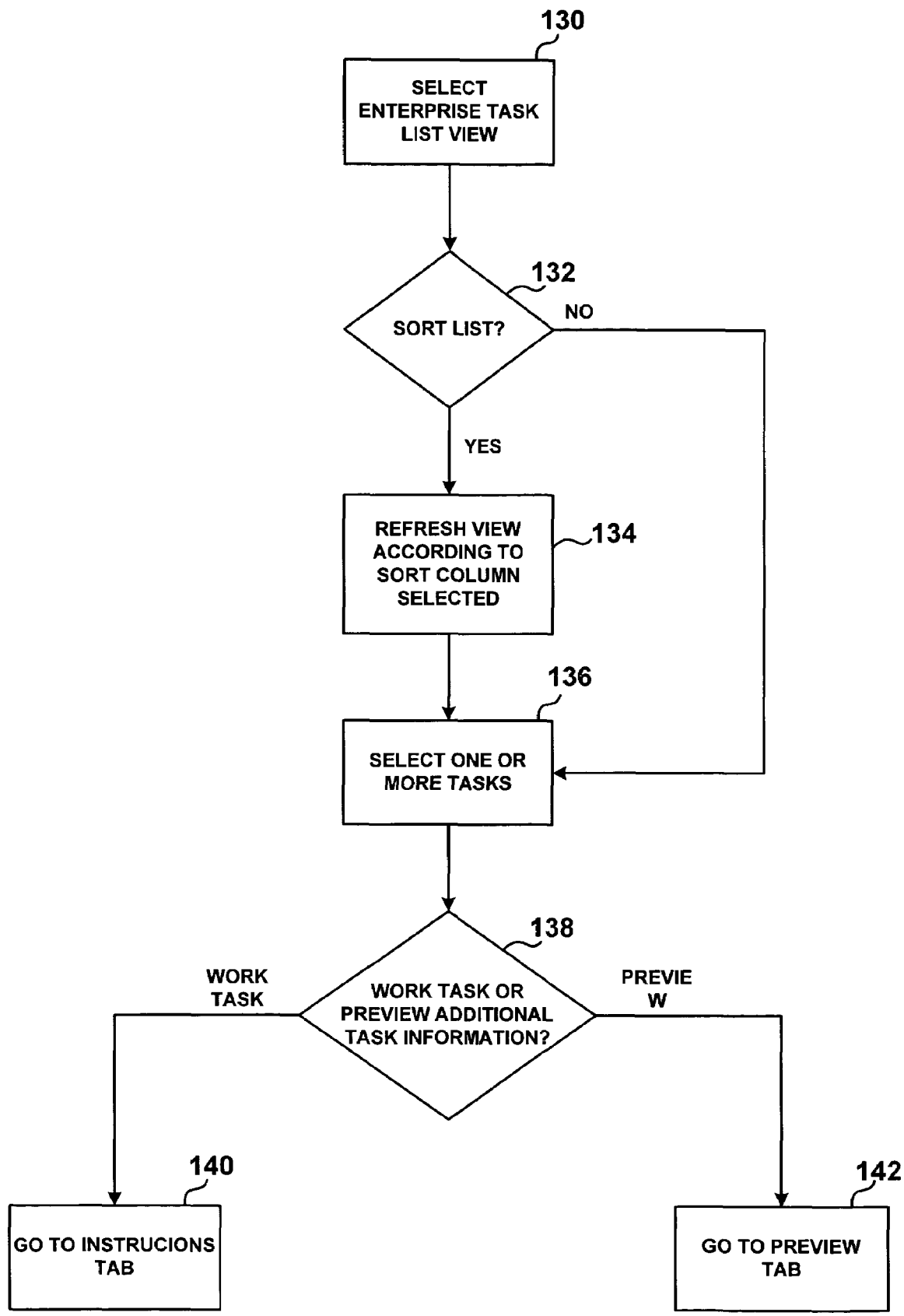
FIG. 7 is a flow chart of steps taken by a user when using a graphical user interface according to FIG. 5 or 6.

As described above, a user typically interacts with task manager module 60 of ETM system 24 to view and work tasks included on enterprise task list 22. As also described above, enterprise task list 22 is displayed to a user via GUI 64. Referring now to FIGS. 5-7, GUI 64 includes a first portion 90 and a second portion 92. First portion 90 includes enterprise task list 22. Second portion 92 includes a preview tab 94 and corresponding preview text box 96 and an instructions tab 98 and corresponding instructions text box 100 (shown in FIG. 6). Of course, in other embodiments, additional tabs may be included. In addition, any type of data, link, or instruction may be included in each tab included. A plurality of buttons facilitates user interaction with enterprise task list 22. Edit button 102 allows a user to edit a selected task 104. In FIGS. 5 and 6, only one task, selected task 104, is selected as denoted by the "X" in task selection column 106 to the left of "Task Name" column 107. However, a user may select a plurality of tasks for viewing and or working by marking the box in task selection column 106 for each task desired. New button 108 allows a user to manually add a new task to enterprise task list 22. Actions button 10 allows a user to select actions from a dropdown menu (not shown) having predefined actions for working common tasks. Examples of predefined actions include but are not limited to hiding preview or instructions tabs 94 and 98, viewing selected tasks, manually marking tasks as done, reassigning tasks, and adding notes to tasks.

Enterprise task list 22 generally includes a plurality of data columns 112 that include data related to a particular task. The particular data columns included in data columns 112 are determined according to a particularly selected view 114 that is selected from a view dropdown box 116. Particularly selected view 114 causes system 24 to run a query against task database 68. The tasks that match the view query are displayed on enterprise task list 22. In addition to data from task database 68, data from sources outside of task database 68, e.g., data from a target object, may be included in enterprise task list 22. As mentioned above, a system administrator, using task engine module 62, creates the views that populate view dropdown box 116. A user may typically access any views included in view dropdown box 116. After selecting a view, a user may alter selected view 114 by selecting a particular column header 118 thereby sorting enterprise task list 22 according to the data contained in the column beneath the selected header column 118.

Preview tab 94 and corresponding preview text box 96 allow a user to view additional data related to any of the tasks in enterprise task list 22. Typically, a user highlights a particular task using pointing device 52 to designate it as the presently selected task (not shown). Data related to the presently selected task populates preview text box 96. In this way, a significant amount of data may be displayed with respect to each task in enterprise task list 22.

To begin working a task, a user may select start task button 120 or select instructions tab 98. Selection of start task button 120 or instructions tab 98 causes the instructions tab to be selected thereby simultaneously displaying instructions text box 100 (as illustrated in FIG. 6) and hiding preview text box 96. Instructions text box 100 typically includes a list of options 122 for working the presently selected task. In FIG. 6, list of options 122 is numbered and arranged in a particular order. However, in other embodiments, list of options 122 may not be numbered or arranged in any particular order. In addition, in some instances, a task may only be informational and no instructions will be provided.

Referring now to FIG. 7, GUI 64 is arranged in such a manner as to facilitate efficient interaction by a user with enterprise task list 22. Typically, a user first selects a particular enterprise task list view from view dropdown box 116 at step 130. Next, at step 132, a user decides whether to sort particularly selected view 114 of enterprise task list 22 according to one of column headers 118. If the user decides to sort enterprise task list 22, the list is refreshed and sorted according to the column header 118 selected at step 134. If the user does not choose to sort enterprise task list 22, the process continues at step 136 where the user selects one or more tasks to view or work. Referring again to step 134, after enterprise task list 22 is sorted, the process continues at step 136 where the user selects one or more tasks to view or work. After selecting tasks to view or work, at step 138 the user determines whether to work one or more tasks or preview additional task information. If a user decides to work one or more tasks, at step 140 the user selects start task button 120 thereby causing instructions tab 98 and instructions text box 100 to be displayed. Alternatively, the user may select preview tab 94 at step 138 in order to preview additional information about the one or more tasks selected. If preview tab 94 is selected, preview tab 94 and preview text box 96 are displayed. Although not illustrated in FIGS. 5-7, it is contemplated in the present invention that in addition to sorting tasks, the tasks in enterprise task list 22 may be filtered and or arranged in groups or categories.

A system administrator accesses task manager module 60 using GUI 66. GUI 66 generally includes all the same elements as GUI 64. However, GUI 66 will have added functionality that allows a system administrator to make enterprise-wide modifications to tasks, views, security levels, and other system parameters. Therefore, GUI 66 likely will differ from GUI 64 to include additional frames, buttons, and or other portions that facilitate a system administrator's increased functionality over a user.

As described above, task engine module 62 primarily includes two sub-modules: ETM setup 70 and task generation 72. A system administrator typically uses ETM setup sub-module 70 to configure the parameters of ETM system 24. A system administrator users ETM setup sub-module 70 to define task names and their preview/instruction components, to define events, to define task definitions, to define task templates, to define agents, and to define views, roles, and users for a task.

Figure 8:
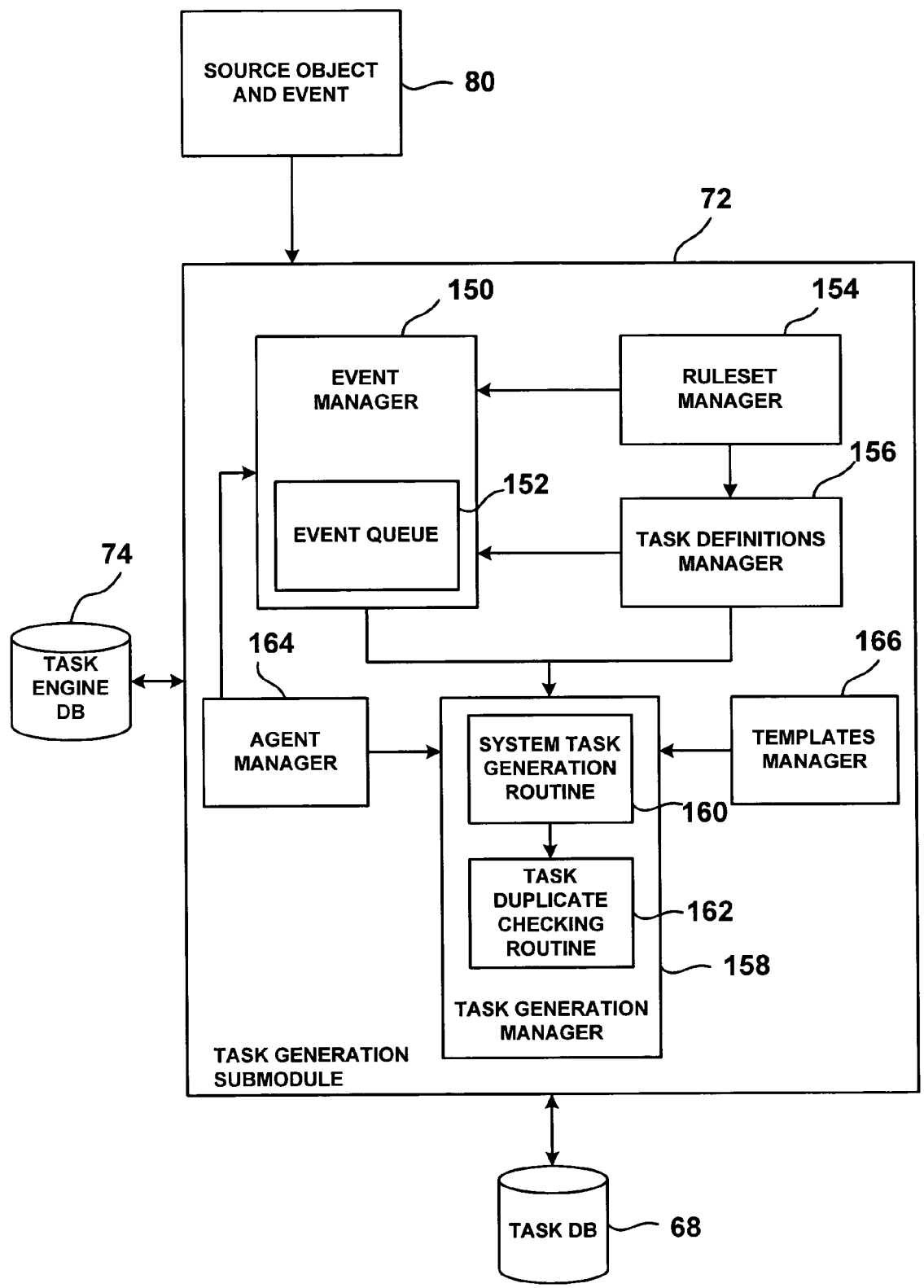
FIG. 8 is a schematic diagram of a task generation sub-module according to one embodiment of the present invention.

Task generation sub-module 72 is utilized by ETM system 24 to generate tasks for inclusion in task engine database 68 and enterprise task list 22. Referring now to FIG. 8, task creation sub-module 72 includes a plurality of manager sub-modules that interact to generate tasks: an event manager 150 having an event queue 152; a ruleset manager 154; a task definitions manager 156; a task generation manager 158 having a system task generation routine 160 and a task duplicate checking routine 162; an agent manager 164; and a templates manager 166.

Ruleset manager 154 supplies ETM rulesets (not shown) to both event manager 150 and task definitions manager 156. Task definitions manager 156 supplies task definitions to event manager 150. Information is sent from event manager 150 and task definitions manager 156 to task generation manager 158 where system task generation routine 160 generates tasks using data supplied by templates manager 166. Templates are described in detail below with reference to FIGS. 11 and 12. Alternatively, information may be sent from agent manager 164 to task generation manager 158 instead of from event manager 150 and task definitions manager 156. In addition, agent manager 164 may place events on event queue 152. Before sending tasks to task database 68, tasks generated by system task generation routine 160 are checked by task duplicate checking routine 162 to determine if identical tasks exist in the system. Acceptable tasks are stored in task database 68 for viewing in enterprise task list 22. The data that populates the managers in task generation sub-module 72 is provided by task engine database 78, which is generally populated based on setup input from a system administrator. Much of the data stored in task engine database 78 is grouped in dictionaries. For example, one dictionary may exist for task names and another for views.

Figure 9:
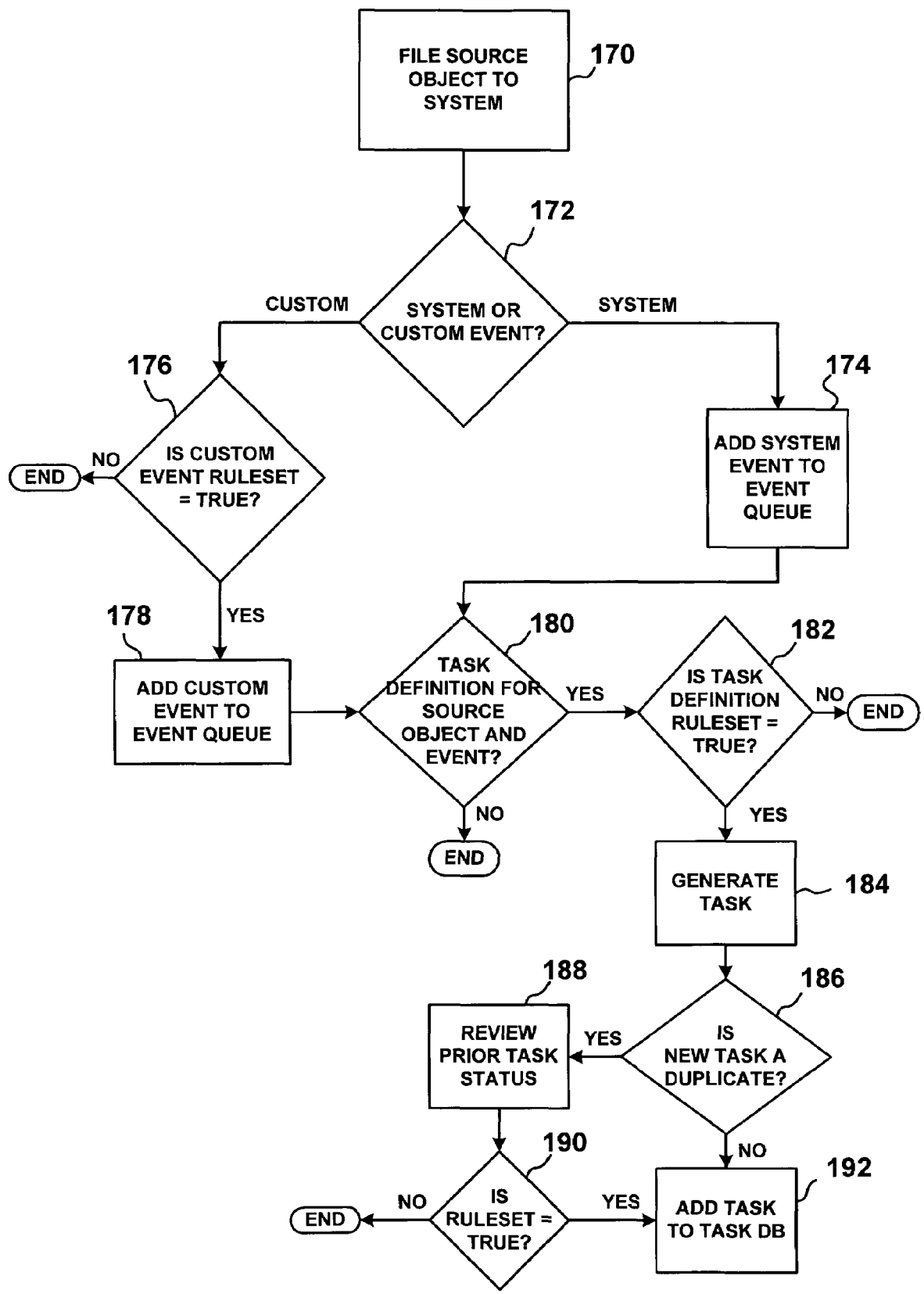
FIG. 9 is a flow chart of a process for generating tasks by the system according to one embodiment of the present invention.

Tasks generated by task generation sub-module 72 of ETM system 24 are devised through a specific process. Referring now to FIG. 9, the process in which system 24 generates tasks is illustrated. At step 170, a source object is filed to the system. As explained above, the source object is paired with a corresponding event. At step 172, it is determined whether the corresponding event is a system event or a custom event. System events are default events provided by system 24. In contrast, a user or system administrator defines custom events.

If the event is a system event, the system event is added to event queue 152 at step 174. If the event is a custom event, at step 176 it is determined whether the custom event ruleset, i.e., an ETM ruleset from ruleset manager 154, accompanying the custom event is true. ETM rulesets are rules that determine when to create custom events or when to create and review tasks. Creation rulesets define the conditions that create custom events and tasks. Review rulesets define the conditions under which the system reevaluates a task in enterprise task list 22 to determine if it still needs to be worked. If the custom event ruleset is not true, the process ends. If the custom event ruleset is true, the process continues at step 178 where the custom event is added to event queue 152.

Next, at step 180, it is determined for each event in event queue 152 whether a task definition exists for the particular event and related source object. A task definition links together the object, event, task name or task reference, and ETM ruleset. Task names in a task definition may explicitly refer to a task name in a particular task name dictionary or provide a column reference to a particular task name dictionary. A system administrator typically defines task definitions in ETM setup sub-module 70 of task engine module 62. If no task definition exists, the process ends. If a task definition exists, the process continues at step 182 where it is determined whether the task definition ruleset, i.e., an ETM ruleset from ruleset manager 154, is true. If the task definition ruleset is not true, the process ends. If the task definition ruleset is true, the process continues at step 184 where a task is generated by task generation sub-module 72.

Next, at step 186, it is determined whether the task generated at step 184 is a duplicate, i.e., is already on file or already exists in task database 68. If the task generated at step 184 is found to already exist, the status of the previously generated task is reviewed at step 188. The status of the previously generated task is compared against a predetermined duplicate checking ruleset (not shown) at step 190. If the duplicate checking ruleset is not true, the process ends. If the duplicate checking ruleset is true, a new task may be generated to overwrite the original task (retain history of original task), the original task may be retained and no new task generated, the original task may be deleted and the new task added (lose history of original task), a duplicate task may be added, or the data fields of the new task may be merged with the data fields of the original task. At step 192, the new or modified task is added to task database 68. Referring to step 186, if it is found that the task generated in step 184 is not a duplicate, the newly generated task will be added to task database 68 of task manager module 60 at step 192.

Figure 10:
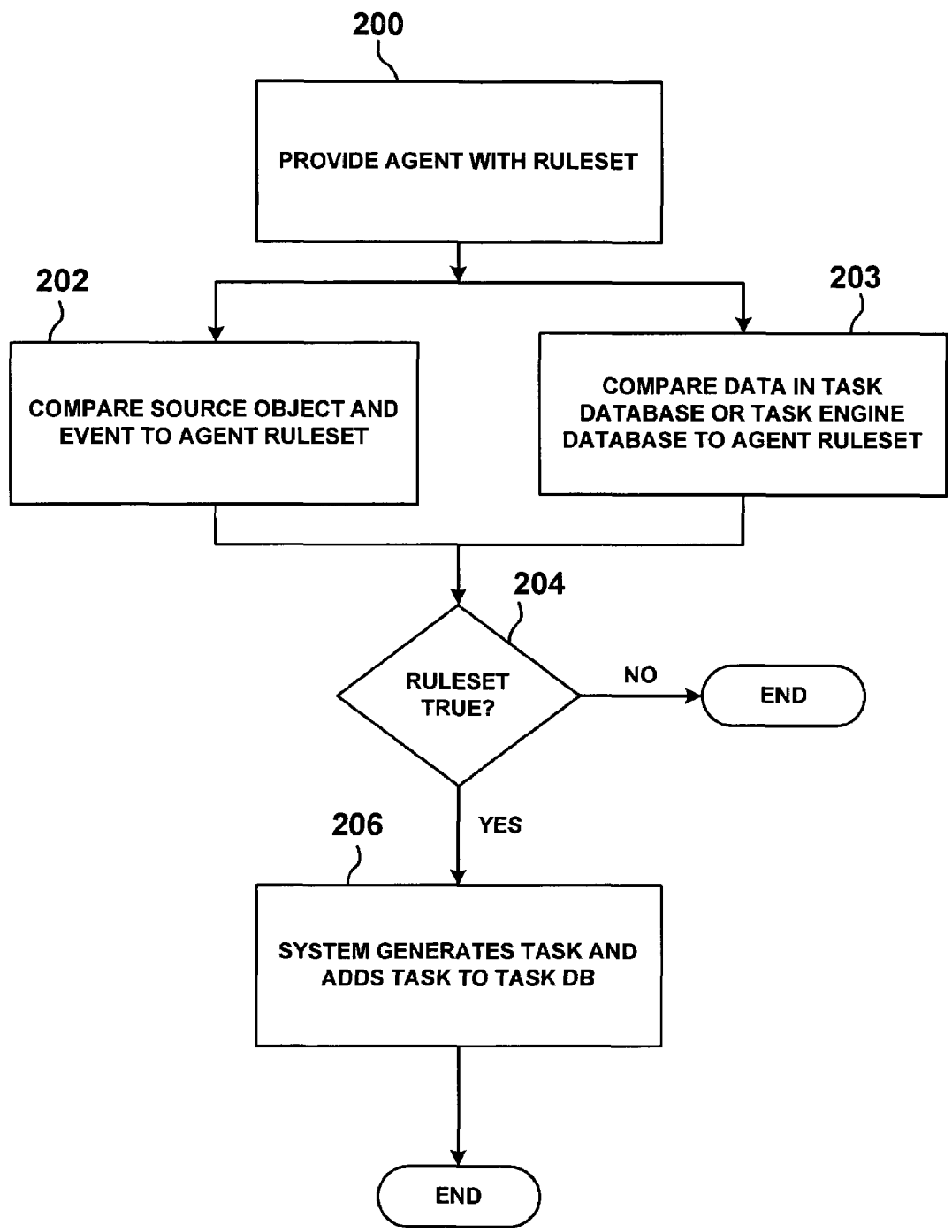
FIG. 10 is a flow chart of a process for creating tasks using agents according to one embodiment of the present invention.

As mentioned above, ETM system 24 may also create tasks via the use of an agent. Another embodiment of the present invention is a method of automatically generating tasks within an enterprise task management system. Referring to FIG. 10, at step 200, an agent having a predetermined ruleset is provided. Next, at step 202 and 203, a source object filed to system 24 and data in task database 68 and task engine database 78 are compared to the agent ruleset. Then, at step 204, it is determined whether the agent ruleset is true. If the agent ruleset is true, a task is generated at step 206 and added to task database 68. If the ruleset is not true, the process ends.

Some agents may merely cause an event to be placed in event queue 152. Other agents will by-pass event queue 152 and cause tasks to be generated and added to task database 68. Other agents may also include a predetermined agent workflow that allows the system to automatically work the task.

For example, an agent may be created that automatically updates certain fields of data within task database 68. The user may initiate application of agent rulesets via queries. Alternatively, agents may be scheduled to operate on a predetermined basis or because of certain events within the system.

Another embodiment of the present invention includes a method of populating task data fields using templates. Templates are placeholders for pointers to default data that system 24 requires to create a task. For example, when system 24 creates a task, it needs to know the date on which the task should be started or reviewed, and the task's priority. System 24 looks to the various task templates for this and other required data. Templates exist at the system, object, task name, and task definition level. System 24 typically uses templates in a set order.

Figure 11:
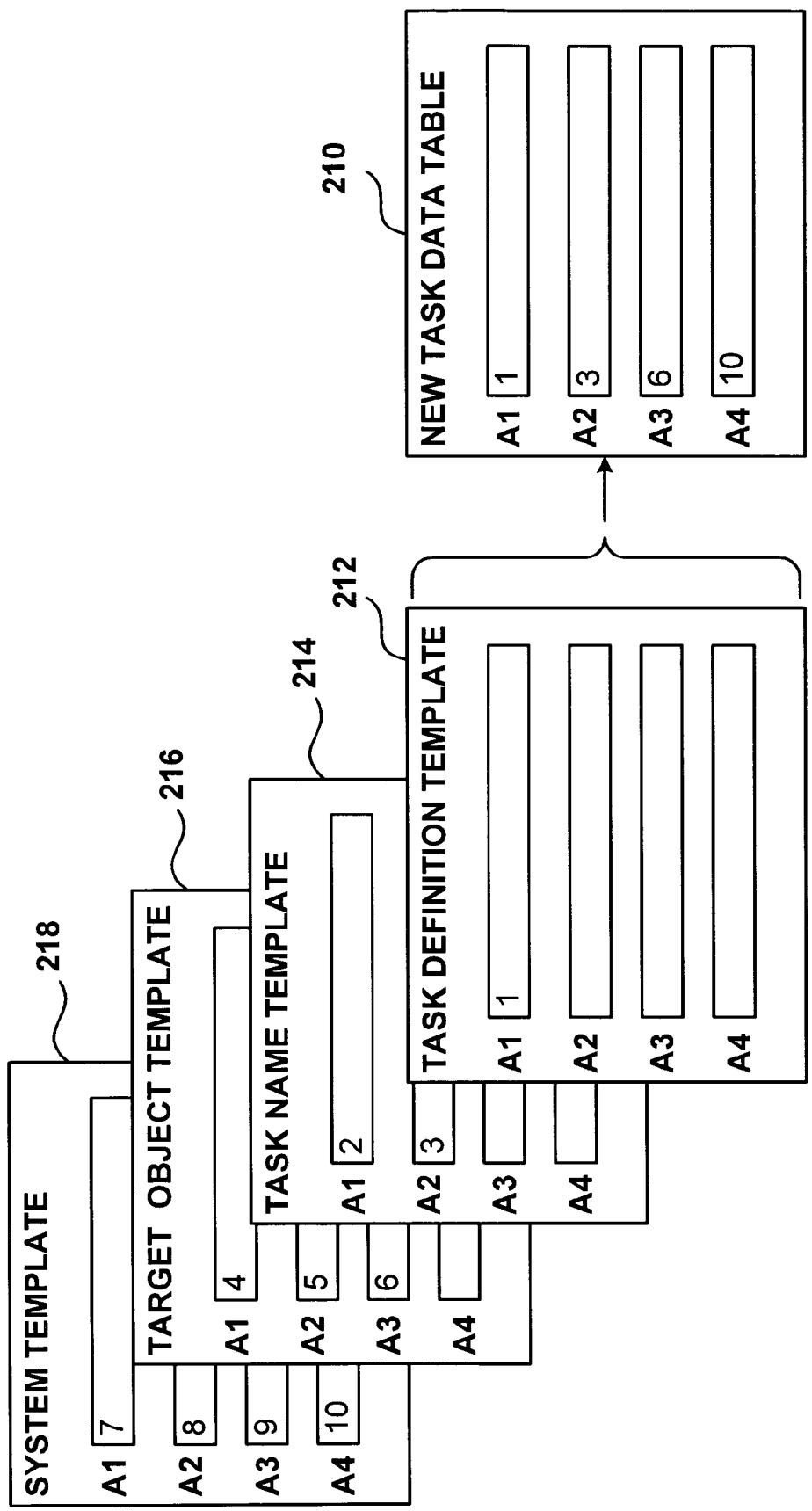
FIG. 11 is a schematic of templates used to populate new task data tables according to one embodiment of the present invention.

Referring to FIG. 11, when system 24 generates a task, a new task data table having task data fields (also referred to as task attributes) including pertinent data regarding the task must be populated before the task can be added to enterprise task list 22. FIG. 11 schematically illustrates the typical templates used to populate task data fields A1, A2, A3, and A4 of new task data table 210. In FIG. 11, the pertinent data for task data fields A1, A2, A3, and A4 of new task data table 210 are "1", "3", "6", and "10" respectively. The typical templates include task definition template 212, task name template 214, target object template 216, and system template 218. In FIG. 11, all of the templates include the same task data fields, A1, A2, A3, and A4. Of course, in other embodiments, each template may contain different task data fields. In addition, in some cases only a few or none of the task data fields in a particular template will overlap with the task data fields in other templates.

As mentioned above, system 24 typically uses templates in a set order: first using values from task definition template 212; then task name template 214; then target object template 216; and lastly system template 218. In FIG. 11, task data field A1 of new task data table 210 is populated with data from task data field A1 of task definition template 212, task data field A2 of new task data table 210 is populated with data from task data field A2 of task name template 214, task data field A3 of new task data table 210 is populated with data from task data field A3 of target object template 216, and task data field A4 of new task data table 210 is populated with data from task data field A4 of system template 218.

Figure 12:
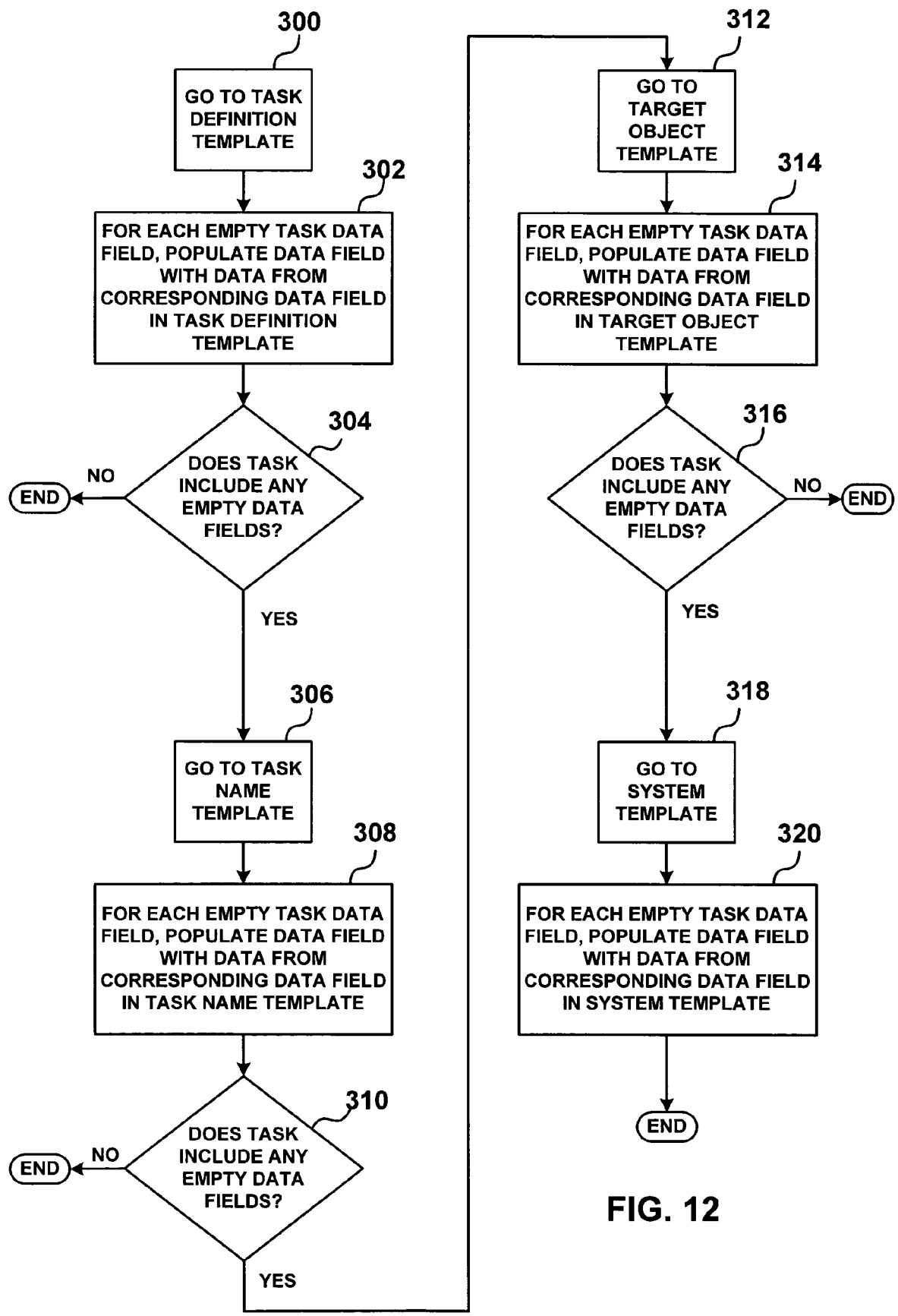
FIG. 12 is a flow chart of a process for populating task data fields using templates according to one embodiment of the present invention.

FIG. 12 illustrates the steps for populating a new task data table using templates. First, in step 300, system 24 goes to the task definition template. Next, at step 302, for each of the task data fields that do not include data, the empty task data field(s) are populated with data from the corresponding data field, if any, in the task definition template. Then, at step 304, it is determined whether any of the task data fields remain empty. If none of the task data fields remain empty, the process ends. If any task data fields remain empty, system 24 goes to the task name template at step 306. Then at step 308, for each empty task data field, the empty task data field is populated with data from the corresponding data field, if any, in the task name template. Next, at step 310, it is determined whether any empty task data fields remain. If no empty task data fields remain, the process ends. If any task data fields remain, the process continues at step 312. At step 312, system 24 goes to the source object template. Then, at step 314, for each remaining empty task data field, the empty task data field is populated with data from the corresponding data field, if any, in the source object template. At step 316, it is then determined whether the task includes any remaining empty data fields. If there are no remaining empty task data fields, the process ends. If any task data fields remain empty, the process continues at step 318. At step 318, system 24 goes to the system template. Then, at step 320, any empty data fields are populated with data from corresponding data fields, if any, in the system template. After completion of step 320, the process ends. Of course, in other embodiments, more or fewer templates may be included.

Figure 13:
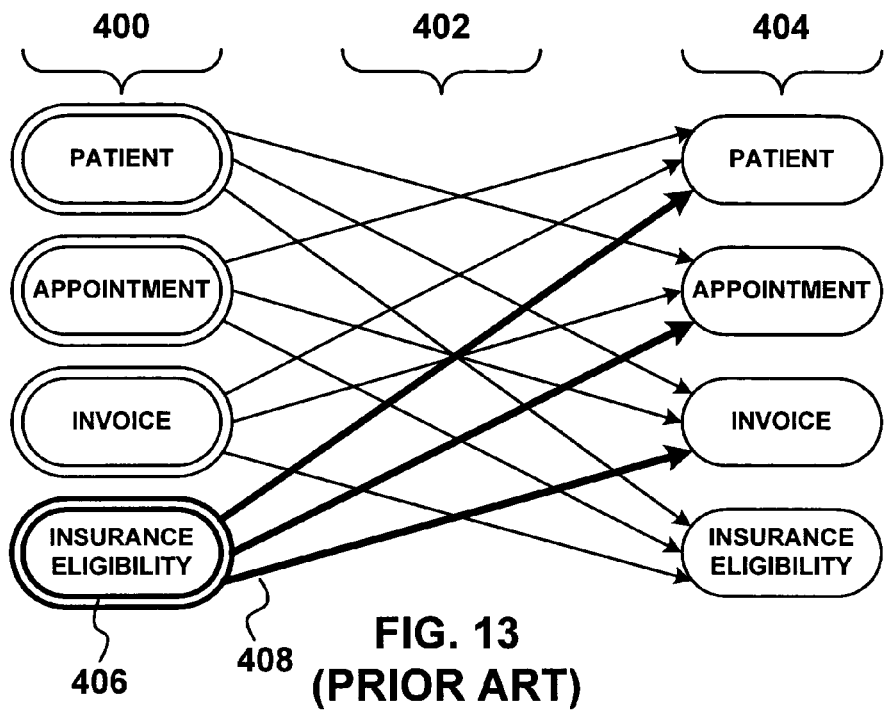
FIG. 13 is a simplified schematic diagram of a prior art task management system architecture.
Figure 14:
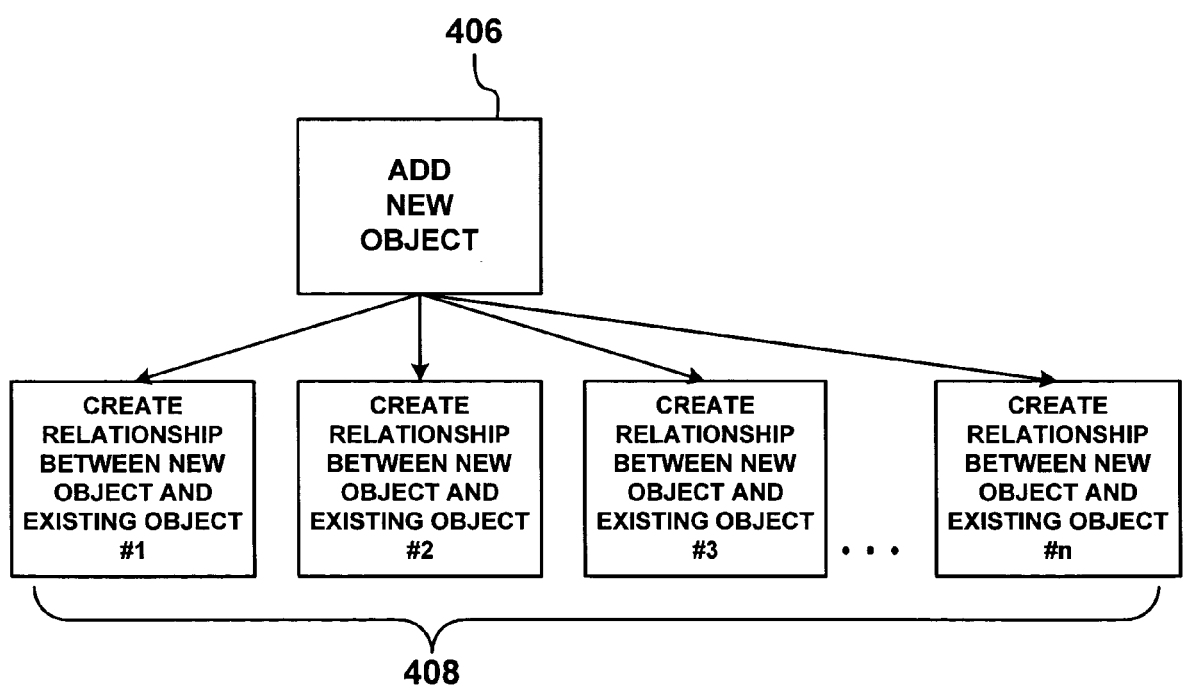
FIG. 14 is a block diagram of a prior art process for adding new objects to the architecture illustrated in FIG. 13.

Another aspect of the present invention is the overall architecture of ETM system 24. FIGS. 13 and 14 illustrate the architecture and processes often found in prior art systems. Prior art system architecture generally includes a plurality of source objects and associated events 400, i.e. "PATIENT", "APPOINTMENT", "INVOICE", and "INSURANCE ELIGIBILITY". Each of source objects and associated events 400 may cause a task 402 to be performed on one or more target objects 404 depending on predetermined relationships between the objects.

As illustrated with respect to "INSURANCE ELIGIBILITY" in FIG. 1 and the process in FIG. 2, when a new object 406 is added, relationships 408 must be established between new object 406 and every related existing object, i.e., "PATIENT", "APPOINTMENT", and "INVOICE" in FIG. 1 and existing objects 1 thru n in FIG. 14.

In a typical architecture, when a new object is added to the system, it is generally designed with transactions (methods or procedures) that it supports. Existing objects wishing to integrate with new ones must define an interface for each of the new object's transactions that it wishes to support. Conversely, new object's wishing to integrate with existing ones must define the interface for each transaction it needs to support. In such an architecture, the interfaces expand geometrically because each existing object needs to interact with some or all of the transactions supported by the new object while at the same time each new object must interact with some or all of the transactions of the existing objects. Typically, these kinds of interfaces are statefull with the need to maintain the state after the transaction has been completed greatly adding to the complexity of the transaction itself.

Figure 15:
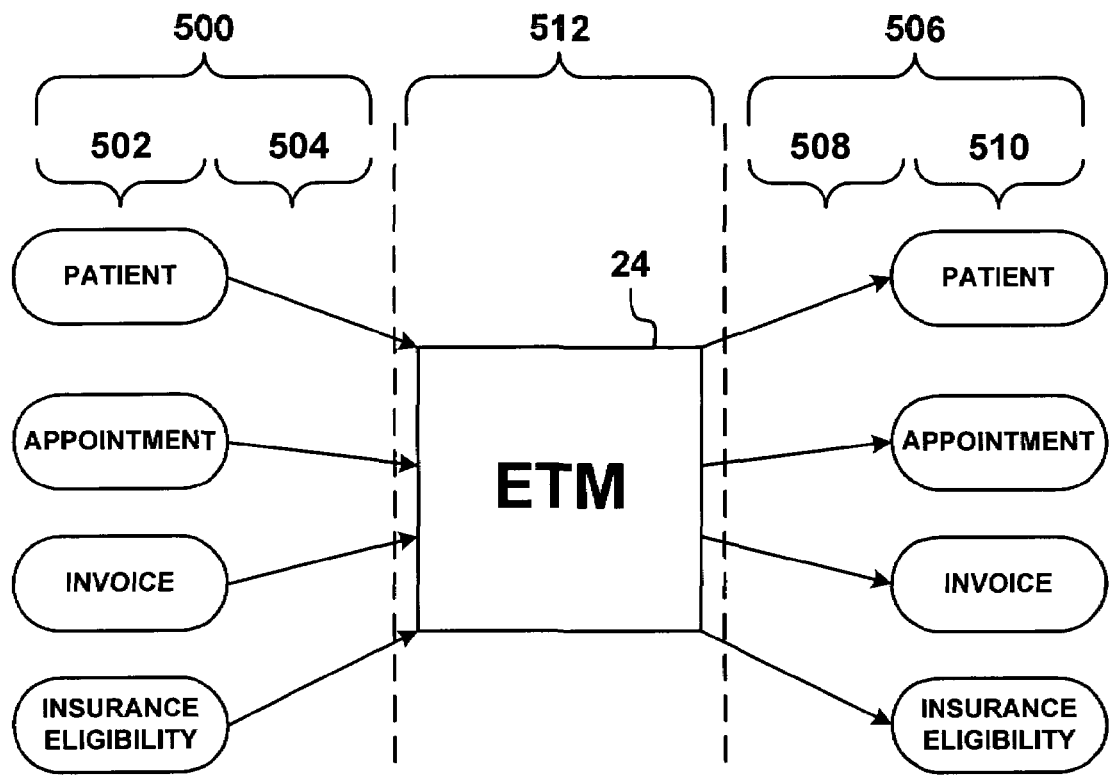
FIG. 15 is a simplified schematic diagram of a task management system architecture according to one embodiment of the present invention.
Figure 16:
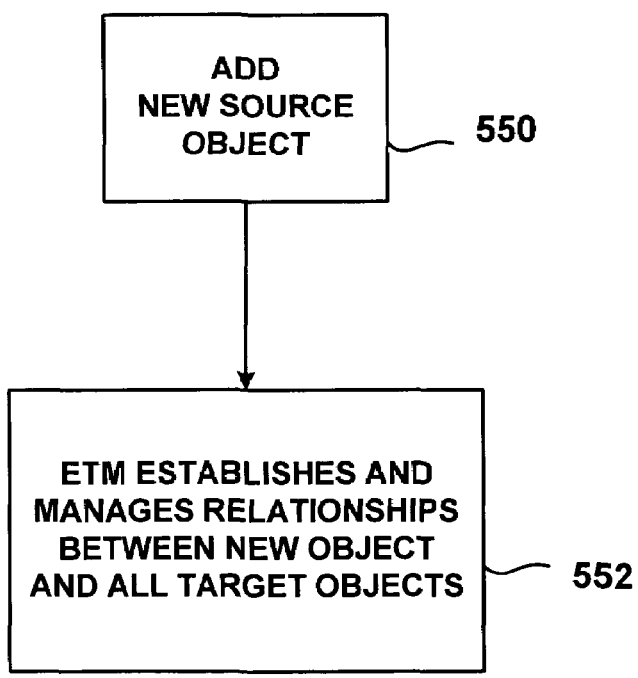
FIG. 16 is a block diagram of a process for adding new objects to the architecture illustrated in FIG. 3.

FIGS. 15 and 16 illustrate the "hub and spoke" architecture used in ETM system 24 of the present invention. Referring to FIG. 15, a first layer 500 includes a plurality of source objects 502 and corresponding events 504. A second layer 506 includes a plurality of tasks 508 to be performed on a plurality of target objects 510. A third layer 512 is interposed between first layer 500 and second layer 506. Third layer 512 includes ETM system 24 and its various components.

Referring now to FIG. 16, the architecture illustrated in FIG. 15 simplifies the addition of new source objects within the system. A new source object is added at step 550 and ETM system 24 automatically establishes and manages relationships between the new source object and all target objects, as indicated at step 552. In contrast to the prior art architecture illustrated in FIGS. 13 and 14, the architecture of the present invention helps simplify the addition of new source objects within the system and reduces the amount of system administrator level input required to add new source objects. In addition, the architecture of the present invention is effective whether the source objects and target objects are the same or different.

In the architecture of the present invention, as an object is added to the system, its events and methods (transactions) are declared to the ETM setup sub-module 70. Direct interfaces between new and existing objects can be avoided (although there may still be the need for some object interaction). Through task definitions, users determine the interaction between events occurring with source objects to tasks (actions) to be taken on target objects. Many such tasks can be completed automatically, by agents, eliminating any user interaction. The creation of such tasks and the actions taken (whether automatic or manual) are always stateless, which greatly simplifies surrounding code. The surrounding code no longer needs to concern itself with properly maintaining and/or updating the state when the transaction (method) occurs.

Another aspect of the present invention includes a task link table. A task link table is maintained that keeps track of all the relationships between source objects, tasks, and target objects. This information is useful to track the number of target objects that are corrected by completion of a single task. For example, when printing claims, a claim will not print if a physician's identification number is incorrect. If 50 out of 1000 claims are directed to a single physician with a faulty identification number, it is desired that only a single task be generated by the system to correct the faulty identification number. However, the task link table will let a user or system administrator know that completion of the single task actually fixes 50 objects or 50 claims.

Another aspect of the present invention is a diagnostic tool for monitoring the status of tasks and recording the history of work actions performed on tasks. A task-tracking attribute allows a user or system administrator to monitor the real-time status of any given task in the system. In addition, a historical register that records the actions worked on each task is a valuable learning tool that can be used to efficiently improve workflows. In connection with a historical register, a user may provide notations that explain actions taken or other pertinent information that may be helpful to a subsequent user.

The architecture of the present invention provides a flexible system for managing tasks across an enterprise. Centrally managing the relationships between source objects and target objects allows both new objects and new rulesets to be introduced to the system without requiring significant hard coding.

Enterprise task manager of the present invention includes a graphical user interfaces that provide both an end-user and a system administrator with a significant amount of information regarding tasks without requiring the user or system administrator to navigate through a complicated web of windows and menus. In addition, the preview and instruction text boxes allow a user to efficiently and accurately work tasks.

The overall structure of the enterprise task manager significantly improves the efficiency of users by creating a centrally located enterprise-wide task list that includes tasks that are manually input by users, created by the system, and created by third party applications. In this way, both the user and system administrator has access in a single location to all the tasks in the system.

For system created tasks, the method of creating tasks using templates insures that the task data fields are accurately and efficiently populated. By arranging the templates in a hierarchical order, the task data fields are populated with the most up-to-date data. The method of creating tasks using agents is an effective way to mine data stored in the enterprise task management system for any errors and to create and perform tasks to correct the data errors automatically. The use of agents is an effective way to automatically improve the quality of data stored within the enterprise task management system.

One embodiment of the present invention has been disclosed and discussed herein, although it should be understood that the present invention is not limited to this (or any other) particular embodiment. On the contrary, the present invention is intended to cover all alternatives, modifications and equivalents that may be included within the spirit and scope of the appended claims.

What is claimed is:

1. A method of generating data maintenance tasks within an enterprise information system, comprising the steps of:
    filing a source object and event to the system;
    determining whether said event is a custom event or a system event;
    adding all system events to an event queue;
    determining for each of said custom events whether a corresponding custom event ruleset is true;
    adding each of said custom events where said corresponding custom event ruleset is true to said event queue;
    determining for each of said custom or system events in said event queue whether a task definition corresponding to each of said custom or system events exists;
    determining for each task definition corresponding to each of said custom or system events whether a task definition ruleset is true; and
    generating a task for each of said custom or system events having a task definition ruleset that is true.

2. A method according to claim 1, further comprising the step of adding said task to an enterprise task list.

3. A method according to claim 1, further comprising the step of determining whether said task is a duplicate task.

4. A method according to claim 1, wherein at least one of said tasks generated is worked by the system.

5. A method according to claim 1, wherein at least one of said tasks generated is presented to be worked by a user.

6. A method according to claim 1, wherein each of said tasks generated includes a predetermined set of instructions for working each of said tasks.

7. A computer storage medium on which is contained a set of computer readable code for generating data maintenance tasks within an enterprise information system, the computer storage code comprising instructions that, when executed by a processor of a computer, perform the steps of:
    filing a source object and event to the system;
    determining whether said event is a custom event or a system event;
    adding all system events to an event queue;
    determining for each of said custom events whether a corresponding custom event ruleset is true;
    adding each of said custom events where said corresponding custom event ruleset is true to said event queue;
    determining for each of said custom or system events in said event queue whether a task definition corresponding to each of said custom or system events exists;
    determining for each task definition corresponding to each of said custom or system events whether a task definition ruleset is true; and
    generating a task for each of said custom or system events having a task definition ruleset that is true.

8. A computer storage medium according to claim 7, further comprising the step of adding said task to an enterprise task list.

9. A computer storage medium according to claim 8, further comprising the step of determining whether said task is a duplicate task.

10. A computer storage medium according to claim 8, wherein at least one of said tasks generated is worked by the system.

11. A computer storage medium according to claim 8, wherein at least one of said tasks generated is worked by a user.

12. A computer storage medium according to claim 8, wherein each of said tasks generated includes a predetermined set of instructions for working each of said tasks.

* * * * *

UNITED STATES PATENT AND TRADEMARK OFFICE
CERTIFICATE OF CORRECTION

PATENT NO. : 7,590,971 B2  Page 1 of 1
APPLICATION NO. : 10/632328
DATED : September 15, 2009
INVENTOR(S) : Ferguson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1810 days.

Signed and Sealed this

Twenty-first Day of September, 2010

David J. Kappos
*Director of the United States Patent and Trademark Office*